United States Patent [19]
Klinkau et al.

[11] Patent Number: 4,948,500
[45] Date of Patent: Aug. 14, 1990

[54] MEMBRANE FILTER PLATE

[75] Inventors: Werner Klinkau, Berg am Starnbergersee; Reinmund Stanik, Marktoberdorf, both of Fed. Rep. of Germany

[73] Assignee: Klinkau Besitzges. mbH, Fed. Rep. of Germany

[21] Appl. No.: 419,602

[22] Filed: Oct. 10, 1989

Related U.S. Application Data

[60] Division of Ser. No. 330,310, Mar. 29, 1989, which is a division of Ser. No. 246,914, Sep. 16, 1988, Pat. No. 4,832,840, which is a continuation of Ser. No. 36,133, Apr. 6, 1987, abandoned, which is a continuation of Ser. No. 673,206, Nov. 19, 1984, abandoned, which is a continuation of Ser. No. 450,786, Dec. 17, 1982, abandoned.

[30] Foreign Application Priority Data

Jun. 4, 1982 [DE] Fed. Rep. of Germany ....... 3221249
Nov. 10, 1982 [DE] Fed. Rep. of Germany ....... 3242917

[51] Int. Cl.$^5$ .............................................. B01D 25/12
[52] U.S. Cl. ..................................... 210/227; 210/231
[58] Field of Search ............... 210/224, 227, 228, 229, 210/230, 231; 100/198, 115

[56] References Cited

U.S. PATENT DOCUMENTS 1,311,280  7/1919  Kiefer .
3,503,326  12/1966 Juhasz et al. .................... 100/115
4,166,035  8/1979  Ramsteck ......................... 210/231
4,343,710  8/1982  Shackleton et al. .............. 210/797

Primary Examiner—Frank Sever
Attorney, Agent, or Firm—Hill, Van Santen, Steadman & Simpson

[57] ABSTRACT

Membrane filter plate for a filter press or the like with a carrier plate, at least one membrane arranged on one side of the carrier plate and preferably provided with spacing cams or the like for applying a filter cloth or the like and a sealing edge surrounding the carrier plate and membrane and interconnecting them in a substantially flow medium-tight manner, the peripheral surface or surfaces of said sealing edge parallel to the carrier plate median plane being arranged in the unloaded normal position thereof on the side having the membrane or on either side of the carrier plate, while being spaced from the membrane plane, wherein the contact surface of the carrier plate facing the membrane runs towards the carrier plate median plane in a transition area located between the connecting line of the membrane with the sealing edge and the central area of the carrier plate, in which it extends parallel to said central plate median plane.

3 Claims, 15 Drawing Sheets

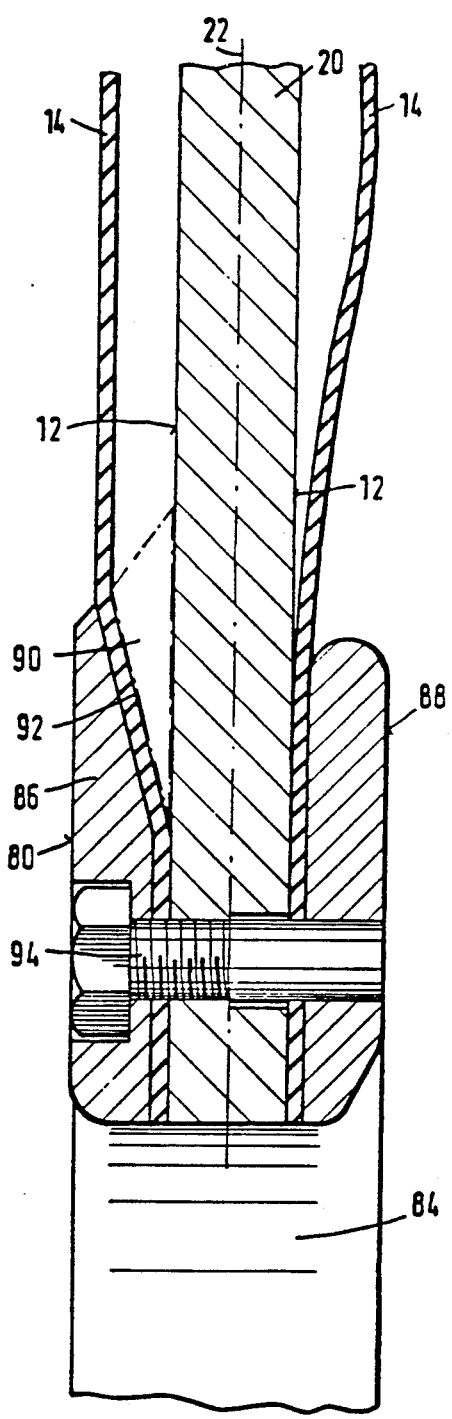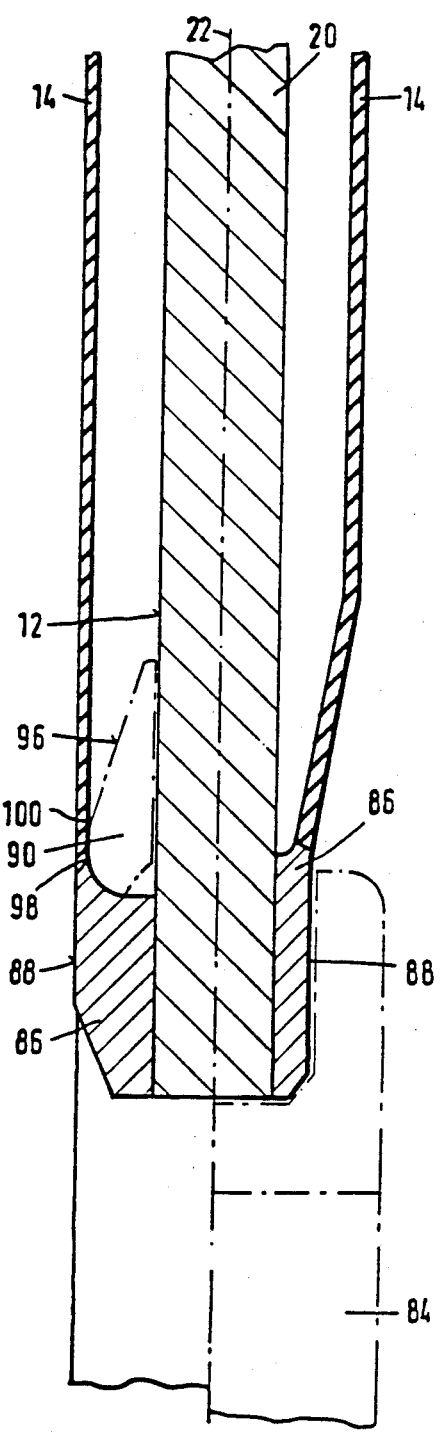

Fig.13
Fig.14
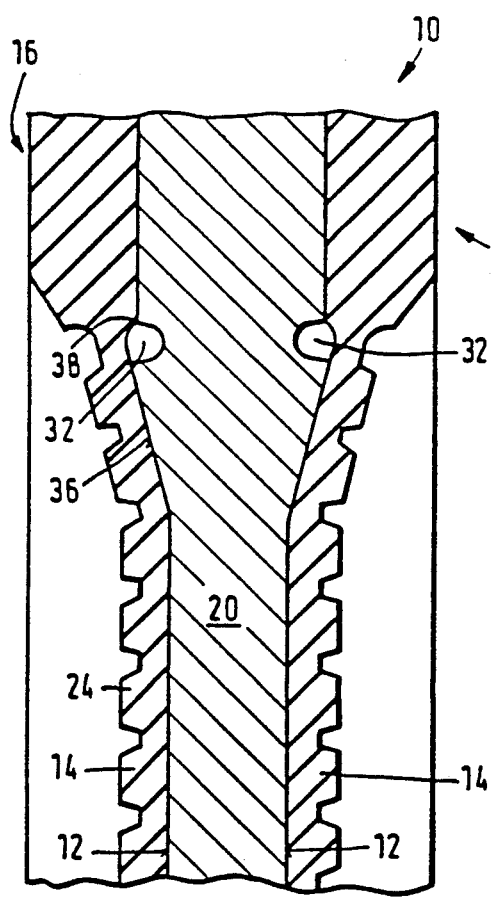
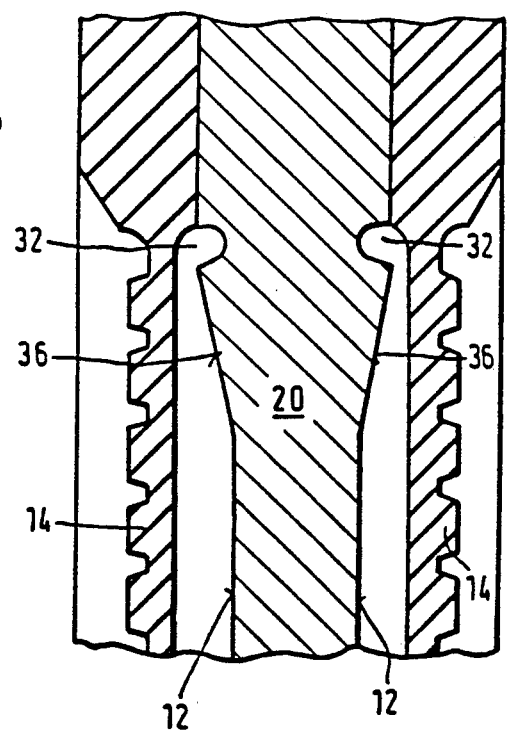

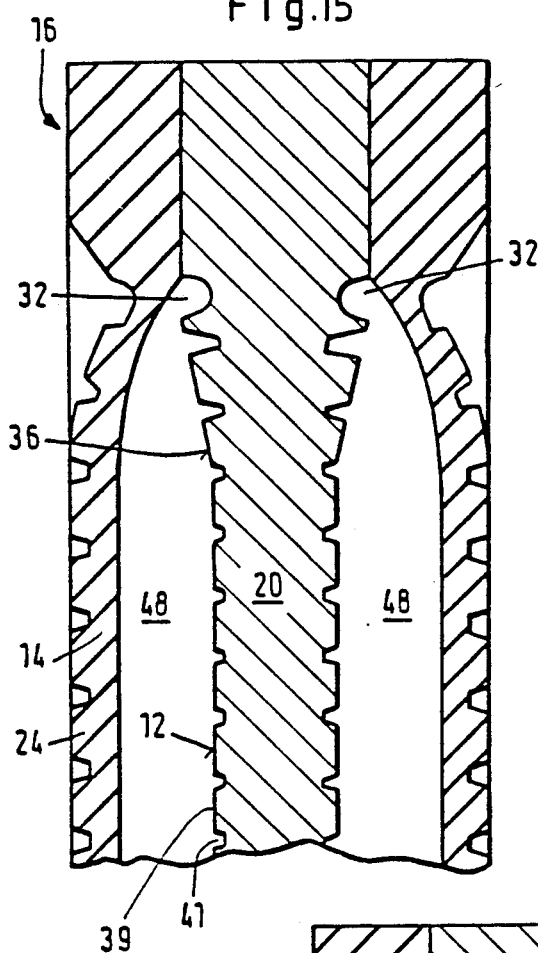
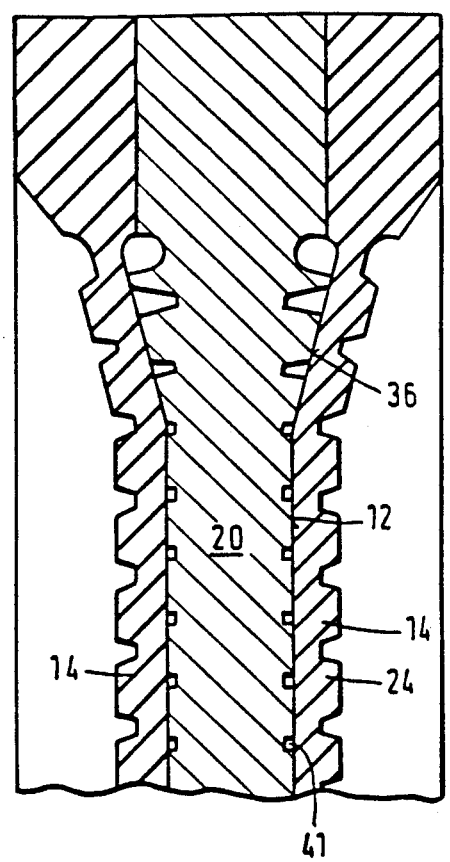
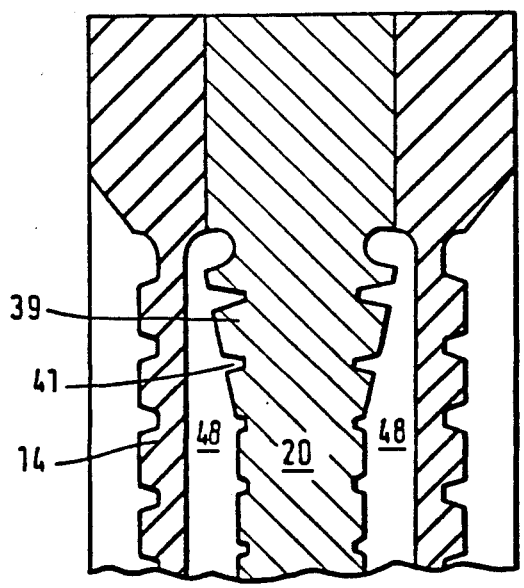

MEMBRANE FILTER PLATE

This application is a divisional application of Ser. No. 07/330,310 filed Mar. 29, 1989 pending, which was a divisional application of Ser. No. 07/246,914, filed Sept. 16, 1988, which issued as U.S. Pat. No. 4,832,840 on May 23, 1989, and was a continuation application of Ser. No. 07/036,133, filed Apr. 6, 1987 (now abandoned), which was a continuation of application Ser. No. 06/673,206, filed Nov. 19, 1984 (now abandoned), which was a continuation of application Ser. No. 06/450,786, filed Dec. 17, 1982 (now abandoned).

The invention relates to a membrane filter plate for a filter press or the like, with a carrier plate, at least one membrane arranged on one side of the carrier plate and preferably provided with spacing cams or the like for applying a filter cloth or the like and a sealing edge surrounding the carrier plate and membrane and interconnecting them in a substantially medium-tight manner with respect to flow, the peripheral surface or surfaces of said sealing edge parallel to the carrier plate median plane being arranged in the unloaded normal position thereof on the side having the membrane or on either side of the carrier plate, while being spaced from the membrane plane.

A difficulty of the hitherto used filter membrane plates is that mechanical stressing of the membrane under the varying compression stresses of the aforementioned type is extremely high, so that the membrane can easily fracture in the vicinity of the connecting line with the sealing edge. This disadvantage has been even more serious in that, therefore, in the hitherto largely used one-piece construction of the membrane with the sealing edge and carrier plate, it has not been possible to optimise the material characteristics of the membrane independently of the requirements of high bending strength or flexibility, etc., to be made on the carrier plate and sealing edge.

The problem of the invention is to provide a membrane filter plate of the aforementioned type, whose membrane has a significantly improved service life compared with those used hitherto. Preferably, it should also be possible to optimize the material characteristics of the individual components of the membrane filter plate, particularly the actual membrane, with a view to the intended use.

According to the invention, this problem is solved in that the contact surface of the carrier plate facing the membrane extends towards the carrier plate median plane in a transition area located between the connecting line of the membrane with the sealing edge and the central area of the carrier plate, in which it extends parallel to said carrier plate median plane.

According to the invention, the contact surface of the carrier plate facing the membrane, for producing in each case one predetermined bending line for the filtration or squeezing phase, from the connecting line of the membrane with the sealing edge is initially constructed substantially parallel to the carrier plate median plane, then slopes towards it and then extends parallel to the carrier plate median plane over substantially the entire central area of the carrier plate.

According to a special embodiment of the invention, the peripheral surface of the sealing edge parallel to the carrier plate median plane in the direction of the center of the membrane filter plate is linked with an interface sloping towards the carrier plate median plane and which drops with a step to the connecting line of the membrane with the sealing edge.

In addition, the slope of the interface to the carrier plate median plane can be greater than that of the chamfered area of the contact surface.

According to the invention, the height of the step can optionally be substantially the same as that of the spacing cams or spacers.

According to another embodiment of the invention, in the transition area, whilst avoiding clearly defined bending lines, the contact surface is constructed as a bevel surface passing into the central area of the carrier plate and with a continuously changing curvature from the connecting point into the carrier plate surface. This embodiment has the special advantage that in the transition area between the sealing edge and the central area, the material stresses of the membrane are kept particularly small.

As a result of the bevel surface with continuously varying curvature, optionally whilst leaving a planar central area, it is possible in the transition area between the central area of the membrane filter plate and the sealing edge to reduce the material stressing of the membrane, on passing from the normal position into the pressing or filtration position to such an extent that the membrane material can be advantageously optimized towards the remaining requirements, particularly e.g. the chemical resistance to the medium to be filtered. As a result of the shape of the transition area of the carrier plate, a significantly reduced surface tension of the membrane in the various operating states is achieved, so that there is a considerably improved resistance to chemical stressing (stress corrosion). Due to the bevel surface provided, it is possible to use much thicker membranes than when there is a single or multiple hinge in the bending area of the membrane, so that the life of the membrane and its stressability are further increased.

To ensure the possibility of higher temperatures of use of the membrane filter plate according to the invention, it is also proposed to provide a contact area between the carrier plate and the membrane which is reduced as compared with an areal contact. In addition, it is also proposed that the contact surface of the carrier plate or the membrane surface facing the carrier plate is provided with spacers. As will be described hereinafter, membrane filter plates constructed in this way can be used in advantageous manner for filtering very hot and also very cold media.

In particular, between the spacers cooling or heating medium ducts can be formed and cooling or heating media can flow through the membrane chamber defined by the contact surface and the membrane. Furthermore, the membrane chamber can be subject to the action of the same flow medium, with a pressure controllable as a function of the operating phase, in both the filtration phase and in the pressing phase.

It is in particular also proposed that the supporting surfaces of the carrier plate spacers facing the membrane are chamfered in the vicinity of the bevel surface in accordance with their general configuration.

If, in the manner described hereinbefore, the contact surface of the carrier plate has a system of spacers, the resulting reduction in the area of contact between carrier plate and membrane leads to a thermal separating layer between them, which prevents the carrier plate from being subject to the action of the medium to be filtered, which may be at a relatively high temperature and which acts on the membrane, in normal operation during the filtration phase. This carrier plate cooling action is naturally also aided if, according to the invention, the spacers form a system of coolant ducts through which flows a coolant, e.g. compressed air, also in the filtration phase.

The resulting thermal decoupling of the carrier plate from the membrane means that even at high temperatures of e.g. 90° C., hitherto considered too high for plastic membrane filter plates, there is neither an inadmissible material stressing, nor a warping of the carrier plate. Such warping action always occurs if the carrier plate is zonally subject to the action of the high temperature of the medium to be filtered, because as a result of its zonally differing thickness, the plate will then become heated and expand to varying extents. Carrier plate warping of this type, which naturally leads to corresponding warping of the complete membrane filter plate, cause different thicknesses of the press cake produced in the pressing phase and this may lead to problems in any following washing process. The invention eliminates all these problems in that, although the membrane is subject to relatively high temperatures of the medium to be filtered, which generally has a favourable influence on its flexibility, the carrier plate is only exposed to a much lower temperature. If desired, the coolant flow can be made so high that the membrane is also cooled, so that it is not thermally overstressed in the case of very high temperatures of the medium to be filtered. It has proved advantageous to use membrane filter plates of the aforementioned type in such a way that in succession a membrane filter plate and a conventional chamber filter plate, i.e. without membrane are provided, which permits an optimum utilization of the outwardly directed curvature of the individual membrane in the pressing phase. In the case of media which have very high temperatures and which have to be filtered, it is obvious that only membrane filter plates according to the invention should be combined in a filter press, in order in this way to ensure cooling of all the plates.

However, in connection with membrane filter plates, problems not only occur when they are used at high temperatures of e.g. 90° C. and it is in fact also difficult to treat media to be filtered having particularly low temperatures, especially below ambient temperature and especially below 0° C. This can once again lead to warping of the carrier plate, if this is subject to the action of the low temperature of the medium to be filtered. However, in particular the membrane itself largely loses its elasticity, so that in the case of the membrane movement necessary in the pressing phase, there are severe membrane material stresses, particularly at the fixing point, so that fatigue failures and other damage can occur. However, the membrane filter plate of the aforementioned type can be used very satisfactorily when the media to be filtered are at low temperatures, by using a heating medium instead of a coolant. This in particular makes it possible to process media which are to be filtered cold, which were hitherto considered unfilterable with plastic membrane filter plates of the aforementioned type.

The reason for this is that the heating medium flowing through the heating medium ducts not only prevents a cooling of the carrier plate to the lower temperature of the medium to be filtered, which prevents warping and the like, but in particular while engaged with the carrier plate, the membrane is kept at a higher temperature than the medium to be filtered, so that in the pressing phase the membrane has a much higher elasticity than would be the case at the temperature of the medium to be filtered. Thus, the membrane remains completely mobile and damage thereto, particularly in the edge area, as can occur with stiffening of the membrane due to an excessively low temperature, is reliably avoided.

According to the invention, it is also possible for the sealing edge to be formed by a sealing edge frame, at least on one side of the carrier plate median plane, whereby the membrane is sealingly received between the frame and the carrier plate surface extending up to the edge area of the membrane filter plate extending at right angles to the carrier plate median plane. In particular, the separating plane between the sealing edge frame and the carrier plate surface can be substantially in the plane of the membrane in its unloaded normal position in the edge area of the carrier plate.

The invention also proposes that the sealing edge frame is at least zonally welded to the carrier plate. In particular, the sealing edge frame can be welded exclusively in the angle area of the angularly constructed carrier plate.

According to another embodiment of the invention, the sealing edge frame is at least zonally connected to the carrier plate by means of dowels passing through bores extending at right angles to the carrier plate median plane in the sealing edge frame or frames, the carrier plate and the membrane or membranes. It is in particular proposed that the dowels are held at least partly by force fit in the material surrounding them.

According to the invention, the membrane bore surrounding the dowel has a larger diameter than the dowel and a ring seal is placed in the thus formed annulus surrounding the dowel.

The invention also proposes that the carrier plate, which has a membrane on either side, is joined to the two sealing frames by a retaining clip made from plastic, metal, etc.

According to another embodiment of the invention, the retaining clip has a web running at right angles to the carrier plate median plane and two frame pins running inwards and parallel to the carrier plate median plane and which engage in corresponding bores of the sealing edge frame. In particular, the retaining clip has a central, inwardly projecting plate pin, located substantially in the carrier plate median plane and which engages in a corresponding bore of the carrier plate edge.

The invention also proposes that at least part of the pin is held in the bores by force fit. The invention also provides that at least part of the pin is bonded in the bores with surrounding material. The invention also proposes that at least part of the pin is welded in the bores with the surrounding material.

According to the invention, the plate pin is optionally constructed longer than the frame pin. The retaining clip also has a locking pin for hanging up the filter cloth which projects outwards substantially into the carrier plate median plane.

According to the invention, the locking pin can also be tapered close to its free end. According to a special embodiment, the locking pin is rounded close to its free end.

The invention proposes a membrane filter plate of the aforementioned type, in which in the central area of the carrier plate there is at least one preferably circular support, whose support surface parallel to the carrier plate median plane is substantially aligned with the peripheral surface of the sealing edge parallel to said median plane, characterized in that the support has a base part projecting from the carrier plate surface substantially up to the plane of the membrane in its unloaded normal position, said base part having an end face extending parallel to the carrier plate median plane and an interface sloping from the end face to the carrier plate surface, as well as a support part substantially projecting from the plane of the membrane in the unloaded normal position up to the support face, whereby an oblique interface runs in the direction of the membrane from the substantially planar support face of the support part.

In particular, the interface of the base part and/or the interface of the support part can be offset in stepped manner at its end remote from the front or support face. According to the invention, the base part is constructed in one piece with the carrier plate. The base part can also be placed on the carrier plate which is substantially planar in its central region.

According to another embodiment of the invention, the base part and/or support part can be welded to the carrier plate. The base part and/or support part can be dowelled to the carrier plate.

According to the invention, the dowel or dowels are at least partly held by force fit in the material surrounding them. According to the invention, the dowel or dowels can at least be partly welded into the material surrounding them. As an alternative, the invention proposes that the dowel or dowels are at least partly bonded to the material surrounding them. In addition, the base part and/or support part can be screwed to the carrier plate.

According to a special embodiment, the invention proposes a membrane filter plate of the aforementioned type, which is provided with a central inlet and which is characterized in that in the sealing region surrounding the central inlet, the membrane is sealingly joined to the carrier plate by means of an annular carrier bracket, whereby the end face remote from the carrier plate has a smaller distance from the carrier plate surface than the interface or interfaces of the sealing edge parallel to the carrier plate plane.

In particular, it can be provided that the carrier bracket is rounded on its edge remote from the central inlet. The invention particularly proposes that the central inlet is surrounded by a thrust ring, whose internal diameter is larger than the diameter of the central inlet and against which the membrane engages.

According to the invention, the support ring has a bevel surface extending substantially obliquely up to the carrier plate surface from the plane of the membrane, in its unloaded normal position, in the direction of the central inlet, and that the carrier bracket is constructed complementary to the bevel surface in the area corresponding thereto.

According to another embodiment of the invention, the carrier bracket is welded to the membrane and/or the support ring and/or the carrier plate. The carrier bracket can also be bonded to the membrane and/or the support ring and/or the carrier plate.

According to the invention, the carrier bracket is screwed to the membrane and/or the support ring and/or the carrier plate. It is also proposed that the carrier plate is dowelled to the membrane and/or the support ring and/or the carrier plate. The dowel is at least partly held by force fit in the material surrounding it. It is also proposed that the dowel is at least partly bonded to the material surrounding it. The invention also optionally proposes that the dowel is at least partly welded to the material surrounding it. The invention also proposes that the carrier bracket is constructed in one piece with the membrane.

The invention also proposes a membrane filter plate, wherein the end face of the support ring facing the membrane, starting from its inner edge, for producing two predetermined bending lines for the membrane, it is initially substantially parallel to the carrier plate median plane, then slopes towards the latter and is then stepped towards the carrier plate surface.

The invention also proposes a membrane filter plate, wherein there is a locking ring passing through the central inlet for holding together the carrier bracket or brackets and the carrier plate.

According to a preferred embodiment, the individual parts are made at least partly from plastic. At least the membrane can be made from a material, which differs from that of the carrier plate and/or the sealing edge.

The invention also proposes that the membrane is made from a self-sealing material. The membrane can also be made from rubber or the like.

According to a further embodiment of the invention in the case of a substantially rectangular construction of the sealing edge and carrier plate, the transition between the narrow sides of the membrane is in each case formed by a quadrant. In addition, the invention also provides for the distance of the membrane from the carrier plate surface being approximately ⅓ of the distance from the peripheral surface of the sealing edge parallel to the carrier plate median plane.

According to a further development of the invention, in its unloaded normal position, the membrane forms a substantially flat slab. The invention also proposes forming slots for constituting supply and discharge channels in the sealing surface of the sealing edge frame facing the membrane.

A further development of the invention provides for the carrier plate to have a substantially all-round weld overflow slot in its edge area adjacent to the sealing edge frame.

Finally, the invention also proposes the interchangeability of the membrane, whereby the latter can in particular have arresting and/or centering points or surfaces or the like, preferably in the vicinity of the sealing edge frame and/or the central inlet. In particular, this makes it possible, for example, to easily carry out a filter cloth or membrane change, because the joining together of the individual parts can be rapidly and reliably realized without the aid of an additional adjusting means or the like.

It is pointed out that the term sloping or oblique in conjunction with the configuration of the contact surface of the carrier plate towards the carrier plate median plane, or in conjunction with the interface of the base part and/or the support part, as well as in conjunction with the bevel surface of the support ring and finally the end face of the support ring towards the carrier plate median plane, is understood to indicate an angle of 3° to 15° and preferably 5° to 10°.

The membrane filter plate proposed by the invention can be made from a large number of suitable materials. Advantageously, for example, the carrier plate can be made from polypropylene, which is also very suitable for the sealing edge frame. Due to the necessary tolerance requirements, it is not generally possible to use materials which are difficult to machine in those cases when it is only possible to obtain the necessary tolerances by mechanical refinishing. It is also possible to use rigid foams, in addition to the thermoplastic materials normally used for such components.

If thermoplastic materials are used, the shaping process can advantageously be employed for producing membrane filter plates of the type according to the invention. The dowels used in several embodiments can also be made from several materials, the function of the dowel being on the one hand the cohesion and dimensional fixing of the individual parts and on the other to absorb certain forces. Thus, for example, the edge dowels extending substantially at right angles to the carrier plate median plane have the function of transferring to the carrier plate, the internal force (filtration pressure) acting on the chamber-side bevel of the sealing edge, if this force component cannot be compensated by the frictional force in the sealing edge area, i.e. by the closing pressure, thereby preventing a bending out of the sealing edge. The necessary number and the dimensions of the dowels, as well as their distribution and materials, can be worked out by those skilled in the art on the basis of the constructional requirements.

When using weldable membrane filter plates in which all components are made from polypropylene or the like, it is advantageous for cost reasons to optionally only provide a local welding, e.g. in the corner area of the membrane filter plates, preferably only in the vicinity of the corner bores, for which purpose e.g. resistance welding (with copper wire inserts or the like) is suitable, as is h.f. welding.

If an interchangeable membrane is used, if the latter is not made from a sealing material such as rubber, it is necessary to provide seals in the corners, i.e. in the vicinity of the corner bores and said seals can naturally also be arranged e.g. around the dowels, although this is not absolutely necessary. The thickness of the seal naturally corresponds roughly to that of the membrane and has a plus tolerance dependent on the Shore hardness.

It is again stressed that in the case where no welding is used, in which the individual parts are exclusively held together by the sealing edge dowels, etc, or by retaining clips, it is possible to freely choose the materials for each individual part. The membranes are interchangeable. No complicated surface configuration in the sealing edge frame area is provided, so that no tolerance problems can occur when changing the membrane and instead a completely satisfactory seal is always ensured. For example, when using thermoplastic materials, the sealing edge frame can be produced by known, proven welded structures. If the membrane is to be produced from a thermoplastic material, it can e.g. by made by stamping or shaping an extruded plate or by shaping from powder or granular material in the compression mould. Rubber membranes can also be vulcanized without difficulty in the planar, uncomplicated form according to the invention. While taking account of this material variant, a mould can be constructed by means of which both plastic and rubber membranes can be produced in a single shape, which makes it possible to considerably cut the manufacturing costs of the membrane filter plate according to the invention. Despite its simple shape, the membrane engages completely tightly between the sealing edge frames, as a result of the dimensions of said frames and the carrier plate. An all-round edge support is formed between these parts on which the membrane completely engages and which ensures that the membrane has in the hereinbefore and hereinafter described manner two separate hinge-like movement zones in the particular predetermined bending lines, one of which is provided for each movement direction.

ON THE DRAWINGS

The invention is described in greater detail hereinafter relative to non-limitative embodiments and the attached drawings, on which:

FIG. 11 is a sectional view taken through a central inlet of an embodiment of the invention.

FIG. 12 is a sectional view taken through another embodiment of a central inlet of a membrane filter plate according to the invention.

FIG. 13 is a sectional view taken at right angles to the plate plane of the area adjacent to the sealing edge of a first embodiment of the membrane filter plate according to the invention in the filtration phase.

FIG. 14 is a representation corresponding to FIG. 13 of the sealing edge area with the menbrane in the unloaded state.

FIG. 15 is a view similar to FIG. 13 of the sealing edge area of a second embodiment of a membrane filter plate according to the invention in the pressing phase.

FIG. 16 is a sectional view illustrating the sealing edge area shown in FIG. 15, but in the filtration phase.

FIG. 17 is a sectional view illustrating the sealing edge area of FIGS. 15 and 16 in the unloaded membrane state.

DESCRIPTION OF THE PREFERRED EMBODIMENTS

Figure 1:
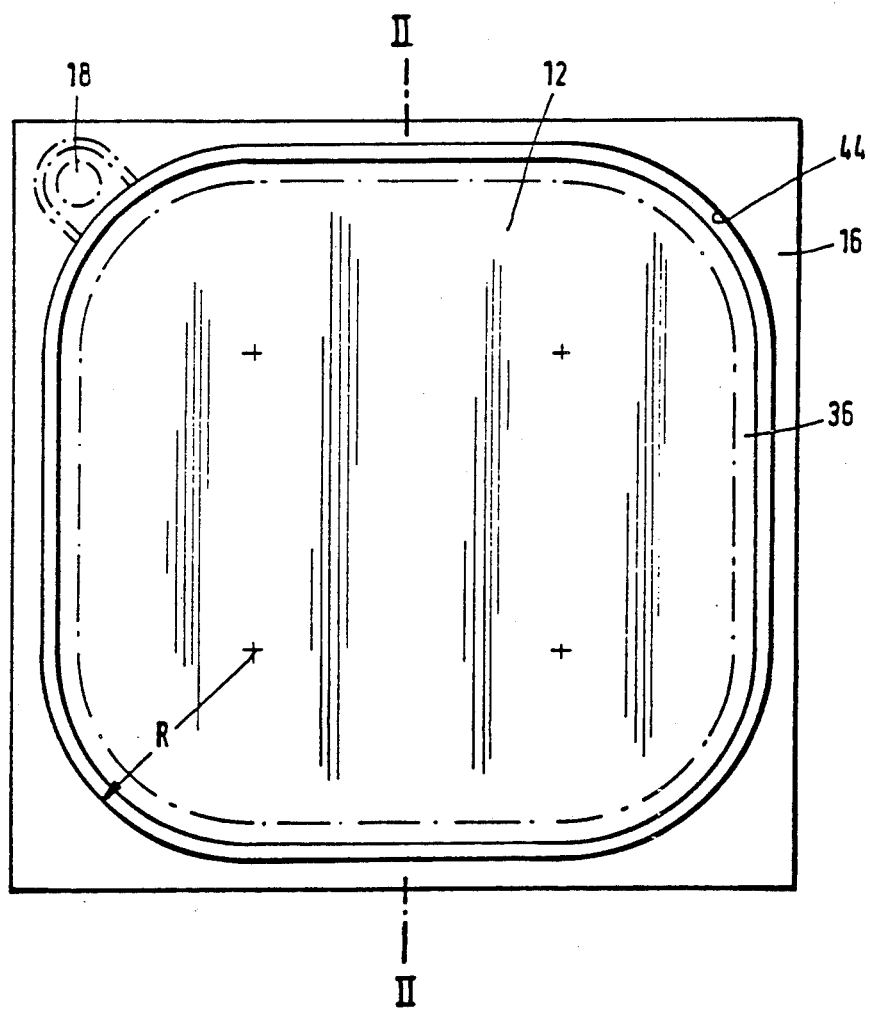
FIG. 1 is a plan view of a first embodiment of a membrane filter plate according to the invention in plan view.
Figure 2:
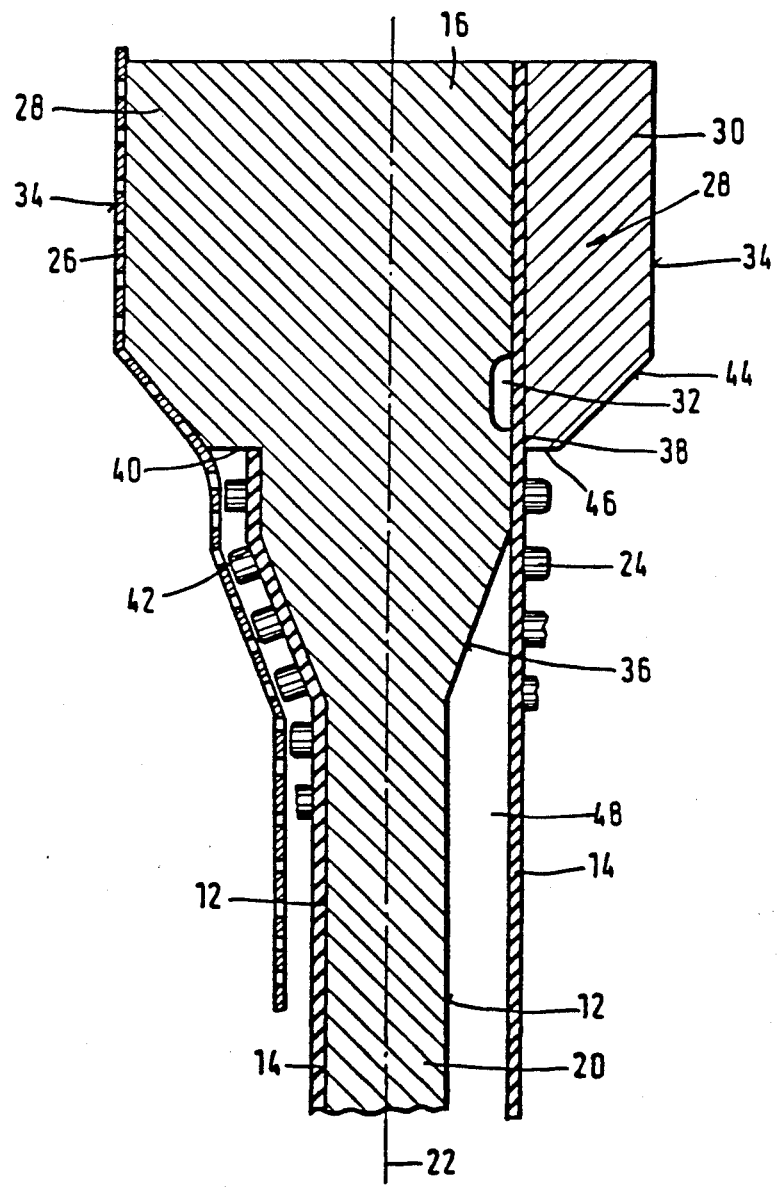
FIG. 2 is a sectional view of the sealing edge of the membrane filter plate of FIG. 1 in section along line II—II of FIG. 1 in a larger-scale representation.

As can be seen in FIG. 1, the membrane filter plate shown in plan view therein has in its central area a substantially planar carrier plate surface 12, covered by a membrane 14 made from flexible material, such as plastic, rubber, etc., which is not shown in FIG. 1, but which can be seen in FIG. 2 and which is sealingly held in the edge area 16 of the membrane filter plate. FIG. 1 also shows that there is a corner inlet 18 and that the four narrow sides of membrane 14 are in each case connected by quadrants at a radius R. In the case of a membrane filter plate with the conventional dimensions 1200×1200 mm, then the radius R is e.g. 320 mm.

As can be gathered from the detail of FIG. 2, a membrane 14 is arranged on either side of carrier plate 20, whose longitudinal median plane is 22. To the right of FIG. 2, it is possible to see that membrane 14, provided on its side facing carrier plate surface 12 with spacing cams 24, spacing ribs, etc., for the application of a filter cloth 26 shown to the left in FIG. 2, is sealingly received between the edge area 16 of carrier plate 20 and a sealing edge frame 28. In the fitted state of FIG. 2, membrane 14 is in its unloaded, normal position in which it forms a substantially flat slab. In the embodiment shown to the right in FIG. 2, the sealing edge frame 28 is connected by means of a dowel 30 to the edge area 16 of carrier plate 20, the dowel being received by force fit in the bore which receives it. However, it can also be bonded or welded, if the material from which membrane 14 is made permits this. It would naturally also be possible to provide a screwed connection between the sealing edge frame 28 and carrier plate 20. The right-hand part of FIG. 2 also shows that edge area 16 of carrier plate 20 has a weld overflow slot 32, which serves to receive the weld overflow in the case, as shown in the left-hand part of FIG. 2, when sealing edge frame 28, membrane 14 and carrier plate 20 are welded together. However, an important part is also played by the weld overflow slot 32 in the embodiment to the right in FIG. 2 in which there is no welding and in which the membrane which is tightly clamped between sealing edge frame 28 and edge area 16 of carrier plate 20. Thus, slot 32 reduces the bearing surface between the spacing edge frame 28 and edge area 16 of carrier plate 20 and consequently increases the pressure on membrane 14 in the actual sealing area surrounding dowel 30, so that the sealing action is improved. The circumferential surface 34 of sealing edge frame 28 parallel to the carrier plate medium plane 22 and to which is applied filter cloth 26, firstly extends parallel to the carrier plate surface 12 with a spacing such that on assembling a series of membrane filter plates of the indicated type in filter presses, the in each case desired filter chamber volume defined by in each case two membranes 14 or the filter cloths applied thereto is obtained.

Figure 7:
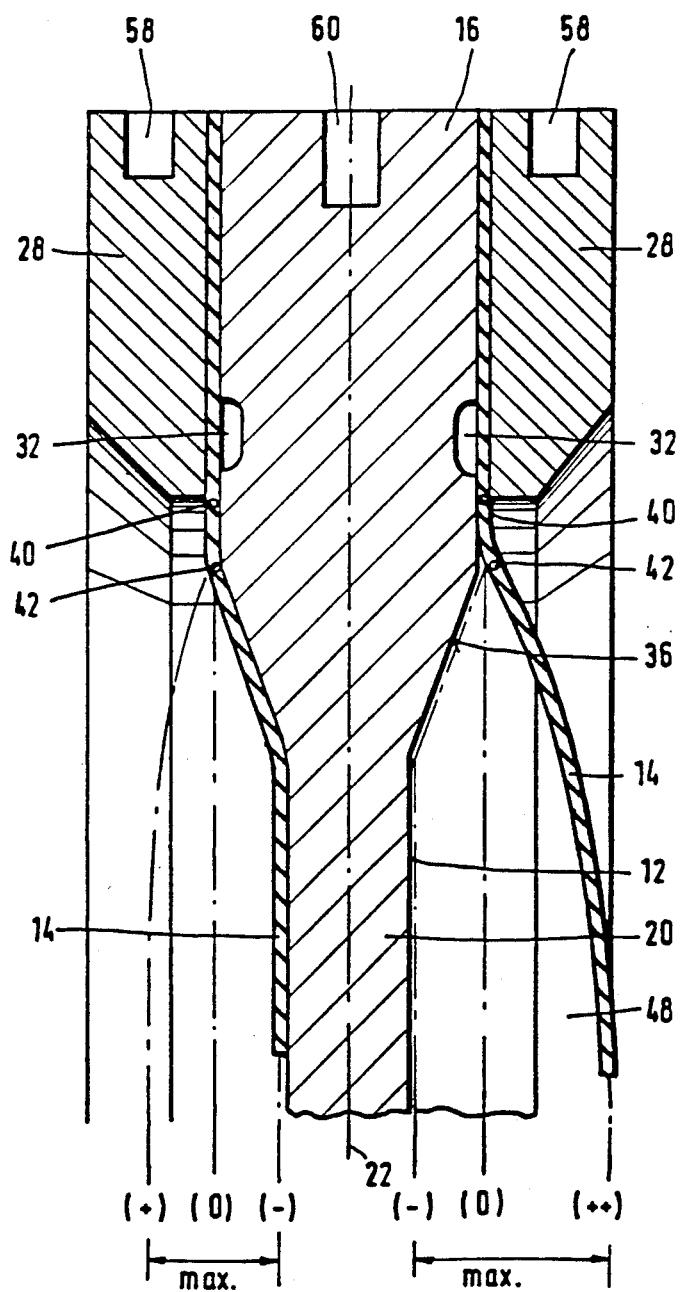
FIG. 7 is a sectional view taken through a membrane filter plate similar to FIG. 4, the membrane movement being indicated.

FIG 2 also shows that the contact surface 36 of carrier plate 20 facing membrane 14, starting from the connecting lines 38 of membrane 14 with sealing edge 34, the membrane 14 runs substantially parallel to the carrier plate median plane 22, then slopes towards the latter and then as a carrier plate surface 12 parallel to carrier plate median plane 22 over substantially the entire central area of the carrier plate for the purpose of producing two predetermined bending lines 40, 42, whose significance will be explained hereinafter relative to FIG. 7. FIG. 2 also shows that the circumferential surface 34 of sealing edge frame 28 parallel to the carrier plate median plane 22, close to the connecting line 38 between membrane 14 and frame 28 follows in the direction of the center of the membrane filter plate onto an interface 44 sloping in the direction of the carrier plate median plane 22, said interface dropping with a step 46 to the connecting line 38 of membrane 14 to sealing edge frame 28. The slope of interface 44 towards the carrier plate median plane 22 is greater than that of the chamfered area of contact surface 36. The height of step 46 essentially corresponds to that of spacer 24, so that the filter cloth 26, in the position of membrane 14 to the left of FIG. 2, which corresponds to the so-called filtration phase in which the membrane chamber 48 between membrane 14 and carrier plate surface 12 is pressureless and consequently has a volume passing towards zero in the manner shown to the left in FIG. 2, while the not shown filter chamber located to the left of filter cloth 26 in FIG. 2 is subject to the action of pressurized medium to be filtered, passes from interface 44 substantially parallel to contact surface 36 and without any step towards the central area of the membrane filter plate. It is also pointed out that the separating plane between the sealing edge frame 28 and the edge area 16 of carrier plate 20 is naturally substantially in the plane of membrane 14 in its unloaded normal position as shown in FIG. 2.

Figure 3:
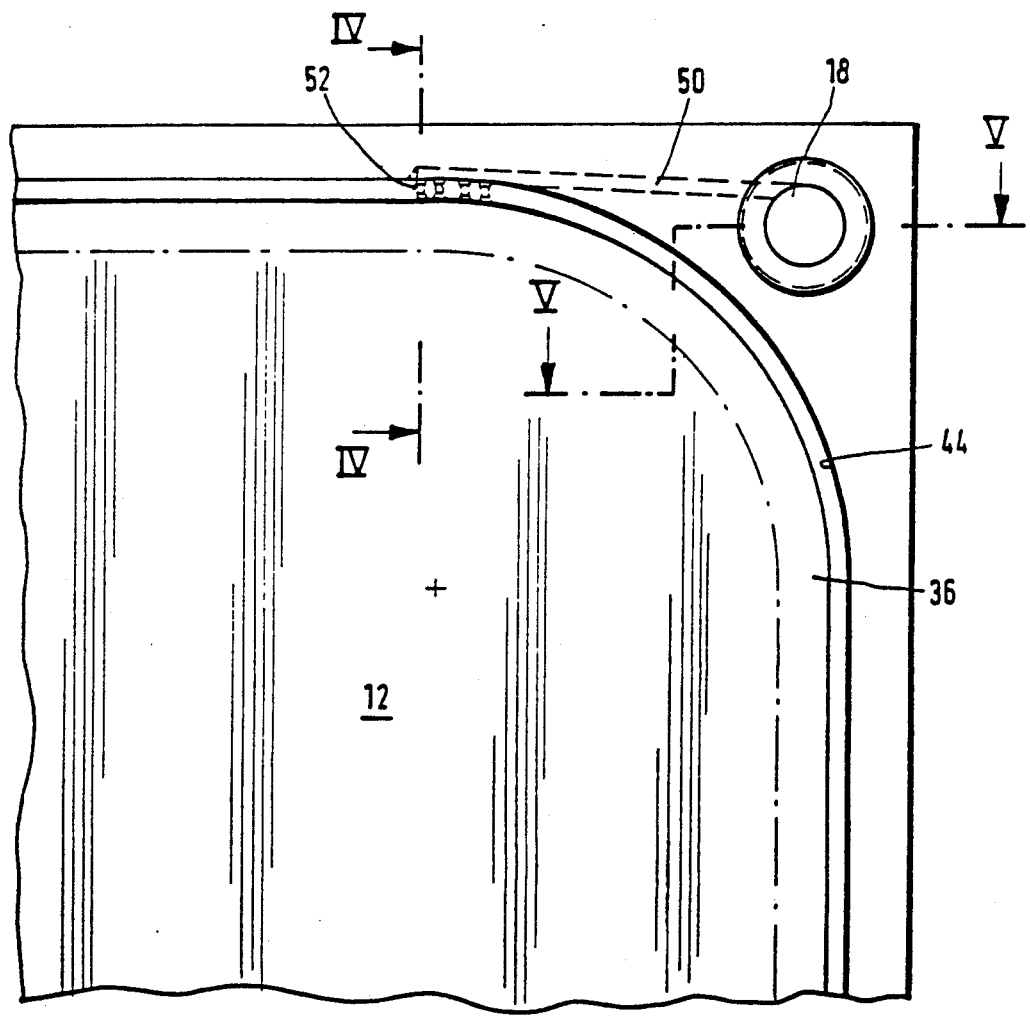
FIG. 3 is a larger-scale representation of a corner area of the membrane filter plate of FIGS. 1 and 2 with details of the supply and discharge bores, partly in section.
Figure 4:
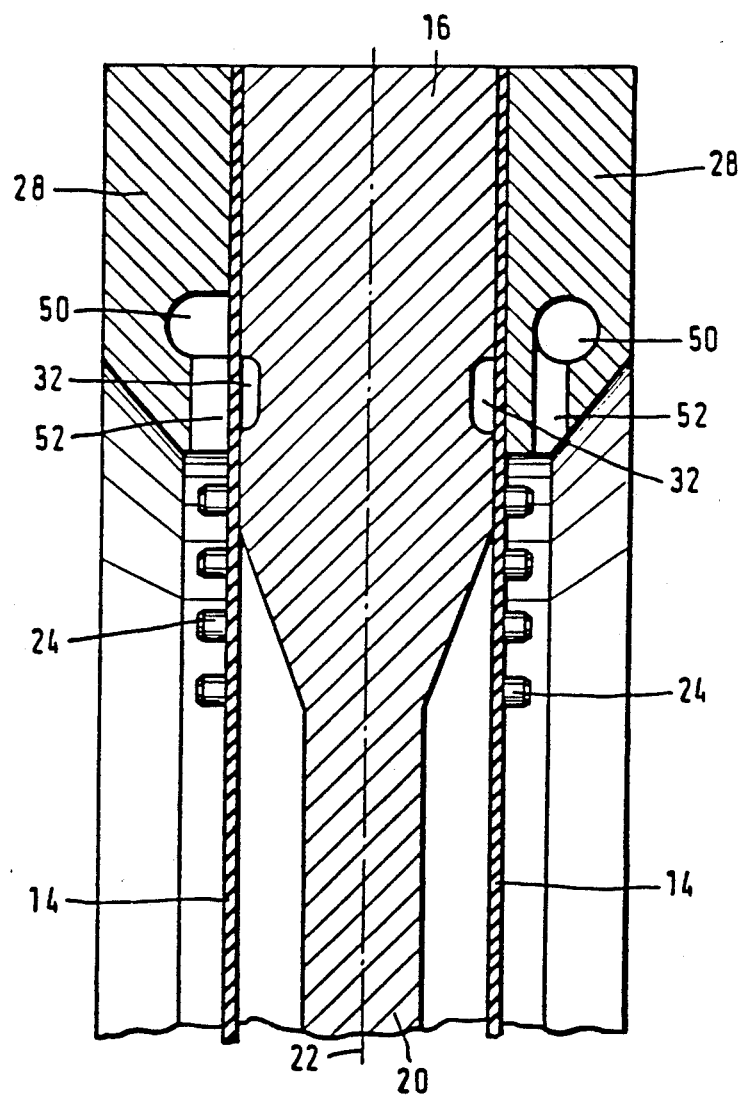
FIG. 4 is a sectional view taken along line IV—IV of FIG. 3.

FIG. 3 shows the corner area of a membrane filter plate with supply and discharge bores. It can be seen that a corner inlet 18 is connected via a channel 50 with a series of transverse bores 52 which, as can be seen in FIG. 4, communicate with the particular filter chamber. In the embodiment shown to the left in FIG. 4, channel 50 is milled into the surface of sealing edge frame 28 and the transverse bores 52 are open towards the sealing surface of sealing edge frame 28 facing membrane 40. This permits particularly easy machining, because the lateral ends of channels 50 can be kept closed from the outset during the production of the sealing edge frame 28, so that there is no need for a subsequent filling by welding or the like. However, the open channel construction according to the left-hand part of FIG. 4 can only be used if the sealing edge frame 28 is not welded to carrier plate 20, because naturally the corresponding channels, bores or slots could otherwise easily become smeared.

However, channel 50 and transverse bores 52 are incorporated into the material of the sealing edge frame 28 in the embodiment shown to the right in FIG. 4, so that in this case easy welding is possible. Welding is naturally impossible if membrane 14 is made from rubber or the like, so that the embodiment of the left-hand part of FIG. 4 is particularly suitable when using a rubber, silicone rubber or similar membrane. The embodiment to the right in FIG. 4 is recommended if a membrane made from a weldable material, e.g. polypropylene is used.

Figure 5:
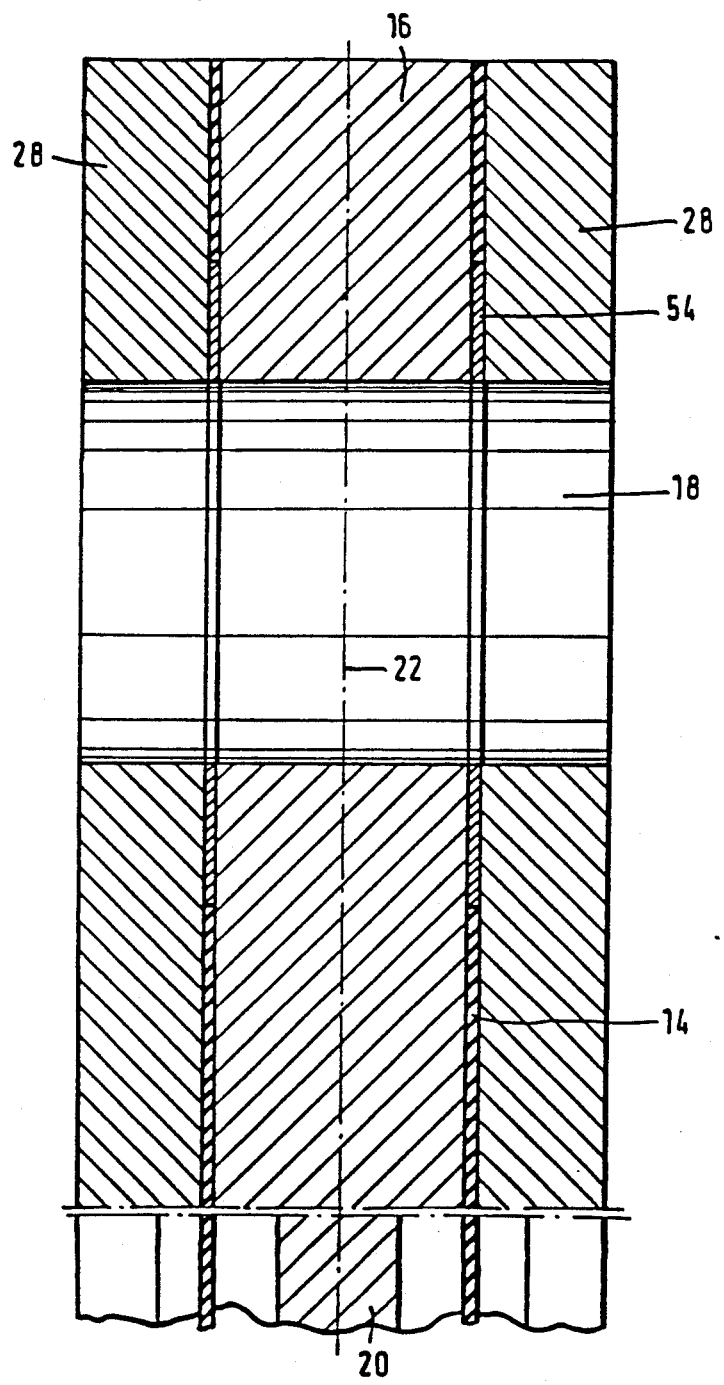
FIG. 5 is a sectional view taken line V—V of FIG. 3.

FIG. 5 shows a corner inlet 18 of the aforementioned type, in which the actual bore is surrounded by a ring seal 54 made from a sealing material. This embodiment is recommended if membrane 14 is not made from a self-sealing material, e.g. if, like carrier plate 20 or sealing edge frame 28, membrane 14 is made from a plastic material, like polypropylene.

Figure 6:
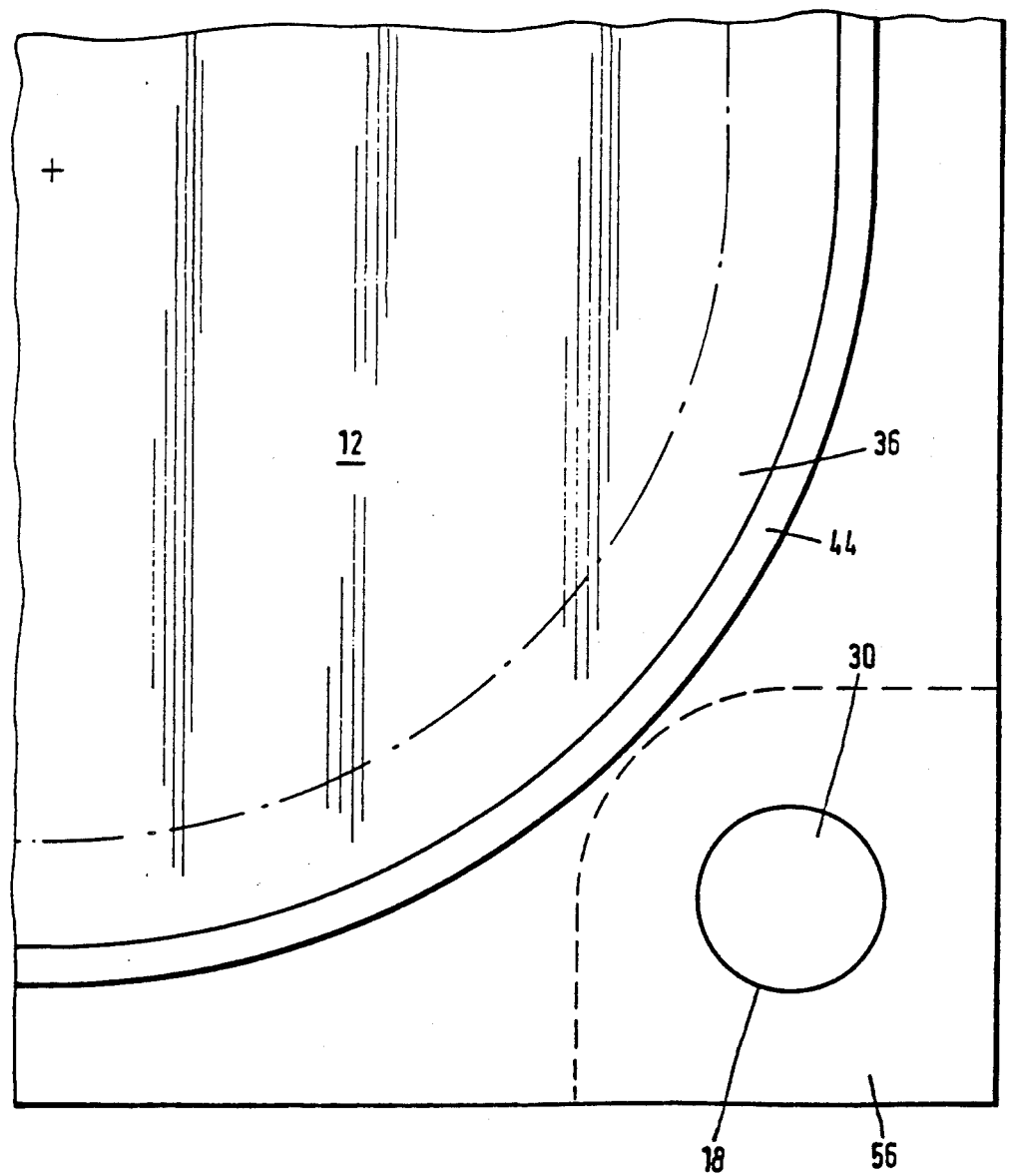
FIG. 6 illustrates a modified embodiment of the construction of the membrane filter plate corner area in plan view.

The detail of FIG. 6 shows that a corner bore 18, which does not serve as an inlet here, is closed by means of a dowel 30, followed by the corner area 56, indicated by broken line. The welding of one or more corner areas 56 can take place e.g. by resistance welding (with an inserted copper wire or the like), whereby it is possible, if necessary, to use additional retaining elements, as will be explained in conjunction with FIG. 9, although the retaining devices shown therein can be usable without any welding of the individual membrane filter plate elements.

The embodiment of FIG. 7 shows that in the edge area 16 of carrier plate 20 and/or in sealing edge frame 28, in each case on the outer edge face, bores 58, 60 are provided, which are used in conjunction with the retaining devices which will be described relative to FIG. 9. FIG. 7 shows in particular the nature of the membrane movement obtained according to the invention.

As can be gathered from the left-hand part of FIG. 7, in which membrane 14 is shown in the position assumed during a filtration phase, in which it tightly engages on carrier plate 20 with the membrane chamber volume passing towards zero, membrane 14 engages in such as way on contact surface 36 in the transition area between the sealing edge frame 28 and the central region of carrier plate 20 that it is only curved around the predetermined bending line 42, before gently passing into the central region of the membrane filter plate. However, to the right in FIG. 7, in the so-called squeezing or pressing phase, membrane chamber 48 is subject to pressure action as a result of incorrect operation, i.e. without the medium to be filtered being supplied to the filter chamber, so that the rightward deflection of membrane 14 assumes a theoretical maximum. It can be seen that the bending down of membrane 14 takes place exclusively around the predetermined bending line 40, whereas the predetermined bending line 42 remains largely unstressed. Due to the shaping of contact surface 36 according to the invention, a combination of two "hinges" is obtained, which are formed by the predetermined bending lines 40, 42, so that membrane 14 is protected from overstressing both in the case of correct operation according to the left-hand part of FIG. 7, i.e. with a normal membrane lift, and in the case of faulty operation, as shown to the right in FIG. 7.

Figure 8A:
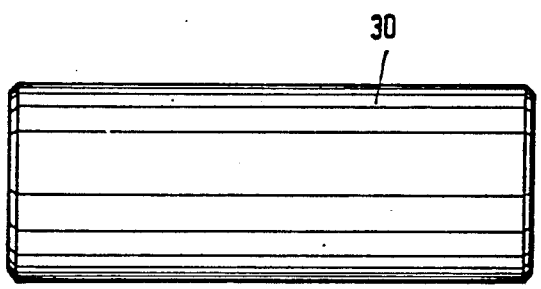
FIG. 8A is a side view and FIG. 8B is an end view of a dowel usable in the membrane filter plate according to the invention.
Figure 8B:
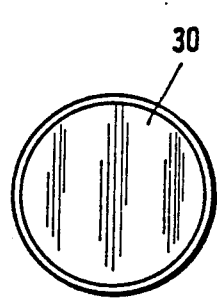

FIG. 8A and 8B shows a dowel 30 which, as shown, is conically tapered close to its end in order to facilitate driving into the bores 18 of the described type. Thus, in the fitted state, dowels 30 always extend at right angles to the carrier plate medium plane 22 and serve either, in the case of welded joints, to close the bores 18 provided in the welding area (like 56) or, corresponding to the force fit, which is e.g. used to secure the individual elements of the membrane filter plate within bores 18 against forces acting parallel to the carrier plate median plane, i.e. radial forces. In the case of a suitable connection with the surrounding material, e.g. by welding, bonding, powerful force fit or screwing, dowels 30 can naturally also absorb forces acting at right angles to the carrier plate median plane 22.

Figure 9A:
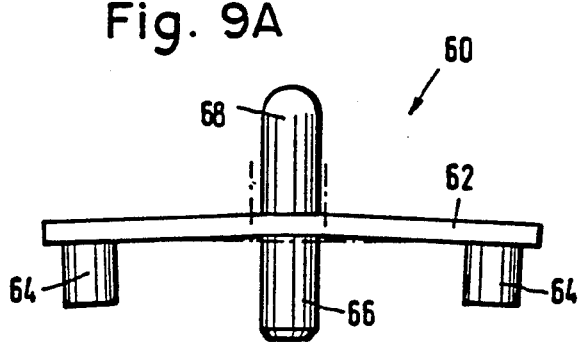
FIG. 9A is a side view and FIG. 9B is an end view of a retaining clip usable in a membrane filter plate according to the invention.
Figure 9B:
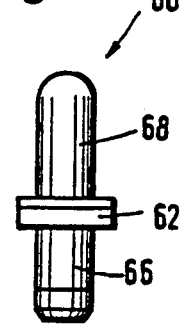

For holding together the membrane filter plate elements against such forces acting at right angles to the carrier plate median plane 22, retaining clip 60' of the type shown in FIG. 9A and 9B are used. Retaining clips 60' have a web and, at the side at the bottom in FIG. 9, two frame pins 64 and a central plate pin 66. Frame pins 64 and/or plate pins 66 are inserted in bores 58, 60 of the sealing edge frame 28 and/or edge area 16 of carrier plate 20, connection once again taking place by force fit, welding, etc, as described hereinbefore in conjunction with dowels 30. On the side of web 62 opposite to plate pin 66 is provided a locking pin 68, which is rounded at its free end and which is used for hanging up filter cloth 26. Around the membrane filter plate are provided several such retaining clips 60', so that not only is a reliable holding together of the membrane filter plate elements against forces acting at right angles to the carrier plate median plane 22 ensured, but also the filter cloths 26 can be adequately secured by means of the rounded locking pins 68. Retaining clips 60' are preferably made from plastic, but other material, such as metal, can also be used. Preferably, and as shown in FIG. 9A, web 62 is slightly angled in order to obtain an internal tension of retaining clip 60', which aids the optionally desired force fit of pins 64, 66 in bores 58, 60.

Figure 10:
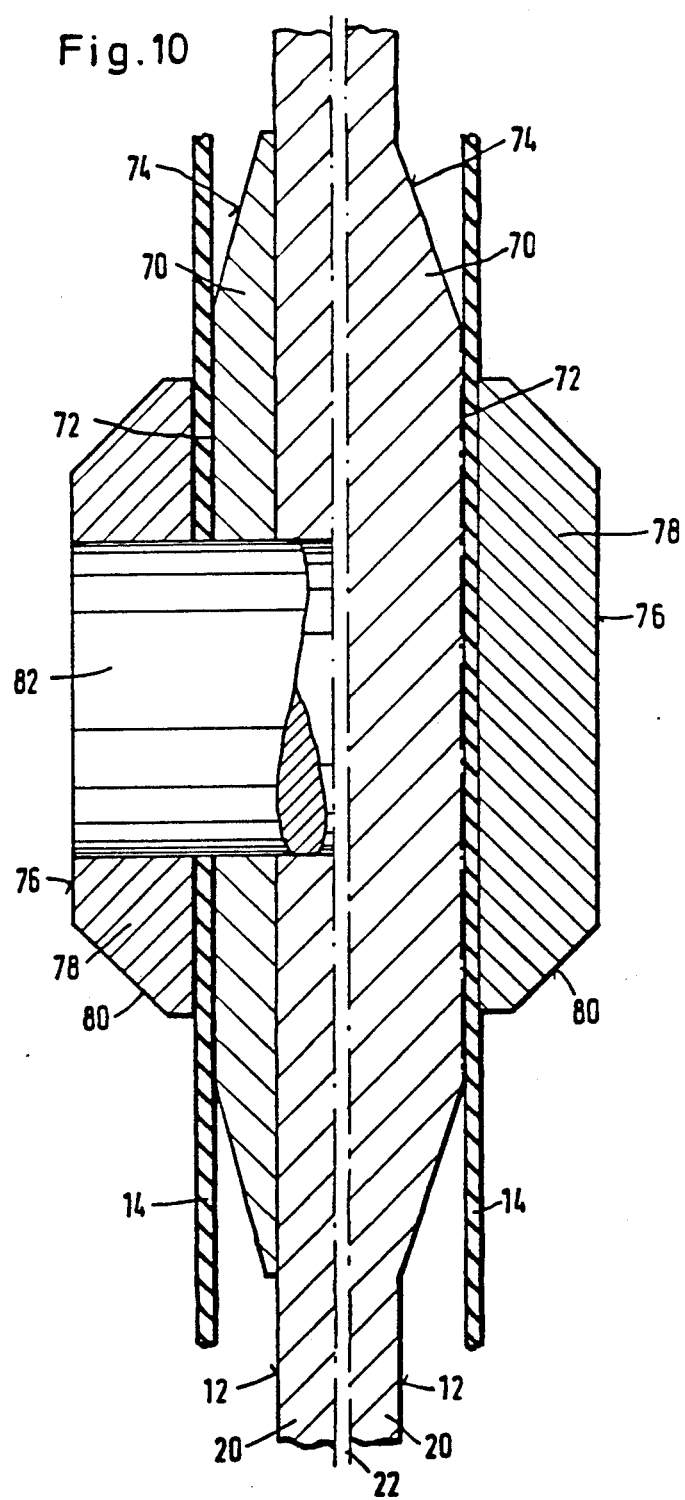
FIG. 10 is a sectional illustration of a support of an embodiment of the invention in a section at right angles to the carrier plate median plane.

FIG. 10 shows two embodiments of the optionally provided support of the membrane filter plate according to the invention. Each of the support has a base part 70 extending from the carrier plate surface 12 substantially to the plane of membrane 14 in its unloaded normal position and which in the embodiment of the right-hand part of FIG. 10 is constructed in one piece with carrier plate 20, whereas in the embodiment of the left-hand part of FIG. 10 is a separate member. Base part 70 has an end face 72 extending parallel to the carrier plate median plane 22 and an interface 74 sloping therefrom to the carrier plate surface 12. In addition, the support has a support part 78 projecting substantially from the plane of membrane 14 in its unloaded normal position to a support face 76 from which an interface 80 slopes towards membrane 14. Both interface 74 of base part 70 and interface 80 of support part 78 are offset in stepped manner in the vicinity of their end face 72 or support face 76.

The base part 70 and/or support part 78 can be connected in various ways to the carrier plate 20, whilst incorporating membrane 14, e.g. screwed, welded or dowelled, as mentioned above with respect to the dowel 30. In the left-hand part of FIG. 10, it is also possible to see a central screw 82, which can optionally be screwed into an internal thread of the corresponding bore of the carrier plate 20. However, it is naturally also possible to provide a bore passing through the complete arrangement at right angles to the carrier plate median plane 22 and into which is screwed the screw 82, optionally using a not shown lock nut.

FIGS. 11 and 12 show different embodiments of the central area of a membrane filter plate with a central filter inlet. In the sealing area surrounding central inlet 84, membrane 14 is connected by means of an annular carrier bracket 86, whose different embodiments will be explained hereinafter, to carrier plate 20 in sealing manner. The end face 88 of the different carrier brackets 86 remote from carrier plate 20 has in each case a smaller distance from the carrier plate surface 12 than the circumferential surface 34 of the sealing edge frame 28 parallel to the carrier plate median plane 22.

In the left-hand embodiment of FIG. 11, the central inlet 84 is spacedly surrounded by a thrust ring 90 (shown in phantom), whose internal diameter is larger than the diameter of central inlet 84. In the embodiment of FIG. 11, the thrust ring 90 has a bevel surface 92 extending from the plane of membrane 14, in its unloaded normal position in the direction of the central inlet 84 and sloping up to the carrier plate surface 12. In this case, carrier bracket 86 is constructed in a completely complementary manner to bevel surface 92 in the area corresponding thereto, so that the membrane 14 is secured between bracket 86 and thrust ring 90.

In the embodiment on the right of FIG. 11, the carrier bracket 86 is rounded on its edge remote from the central inlet 84 and, without the interposing of a thrust ring or the like, membrane 14 is directly introduced into the sealing gap between bracket 86 and carrier plate surface 12. The two carrier brackets 86 are fixed together in the embodiment of FIG. 11 by a screw 94, which either cooperates with a corresponding internal bore or a check nut or counter-bush. However, an overall screwed system, as shown in FIG. 12 can also be used.

Carrier bracket 86 and/or thrust ring 90 can also be welded, bonded or dowelled to carrier plate 22 and/or the membrane, in the manner described hereinbefore. This also applies to the embodiment of the central inlet shown to the left in FIG. 12, in which the membrane 14 is constructed in one piece with carrier bracket 86. A thrust ring is once again applied to carrier plate 20, said ring being constructed in the same way as the aforementioned sealing edge frame 28 in such a way that the end face 96 of thrust ring 90 facing the membrane, as from the inner edge of the ring initially extends substantially parallel to the carrier plate median plate 22, then slopes toward the latter and is then stepped towards the carrier plate surface 12, for producing two predetermined bending lines 98, 100. This leads to the double hinge action described in conjunction with the sealing edge frame 28 on pressurizing membrane 14.

In the embodiment on the right of FIG. 12, membrane 14 is constructed in one piece with the carrier bracket 86, but the latter is so thin that there is no risk of any bending stressing of membrane 14 and consequently there is no need for a thrust ring. It is also possible to see the locking ring (shown in Phantom) passing through central inlet for holding together carrier brackets 86 and carrier plate 20 and this can naturally also be provided with the other embodiments of the central inlet.

The individual parts of the aforementioned membrane filter plate can be made at least partly from plastic in all the embodiments, it being particularly advantageous to optimize the material properties of each individual part, as a function of the particular requirements. Thus, particularly the membrane can be made from a self-sealing material, e.g. rubber and it is also interchangeable, so that this leads to further possible uses of the membrane filter plate according to the invention.

In FIG. 14, the fitted membrane 14 is in its unloaded normal condition and essentially forms a flat slab, whereas in FIG. 13, showing the so-called filtration phase, in which it is moved towards carrier plate 20 by a pressurized medium to be filtered. In the embodiment of FIGS. 13 and 14, the surfaces of carrier plate 20 facing membrane 14 are constructed as bevel surfaces 36 with a continuously varying curvature passing from the carrier plate surface 12 in the central area of carrier plate 20 into the edge area thereof and without any clearly defined bending lines. The passage into the edge area of carrier plate 20 takes place following a weld overflow slot 32 in the vicinity of a connecting point 38 of membrane 14 to the sealing edge. The bevel surface 36 ensures that it is possible to use relatively thick and inflexible membranes 14 without any predetermined bending lines and without any inadmissible material stresses in the membrane fixing area close to the edge. FIGS. 13 and 14 also show that the bevel surface 36 has a planar central area in the centre of the transition between carrier plate surface 12 and edge area 16.

In the embodiment of FIGS. 15 to 17, the surface of carrier plate 20 facing membranes 14 are in each case provided with a plurality of spacer 39, a system of coolant ducts 41 being formed in carrier plate surface 12 and bevel surface 36. This makes it possible to continuously supply with coolant a membrane chamber 48 formed between carrier plate 20 and membrane 14, i.e. for example also in the filtration phase shown in FIG. 16, in which the membranes 14 are pressed against carrier plate 20 under the pressure of the medium to be filtered. This coolant continuously flows through membrane chamber 48 and/or the coolant duct system 41, thereby ensuring an effective thermal separation between the carrier plate 20 and membranes 14. As is clearly shown in FIGS. 15 to 17, the spacer 39 are chamfered in the vicinity of bevel surface 36 in order to obtain a continuous bending of membrane 14 in the various operating states.

Figure 18:
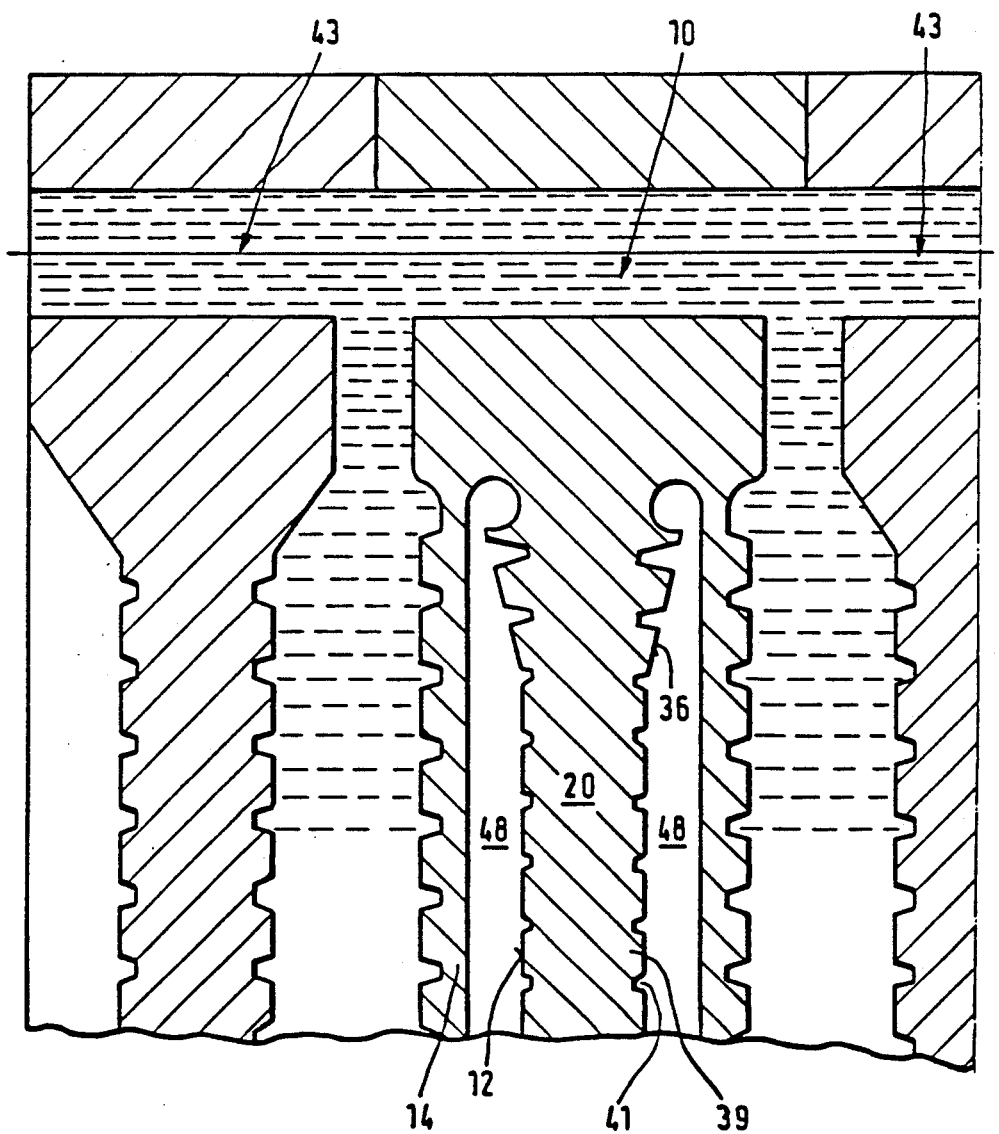
FIG. 18 is a sectional view illustrating the sealing edge area of the membrane filter plate of FIGS. 14 to 17 when incorporated into a filter press and with the membrane unloaded.
Figure 19:
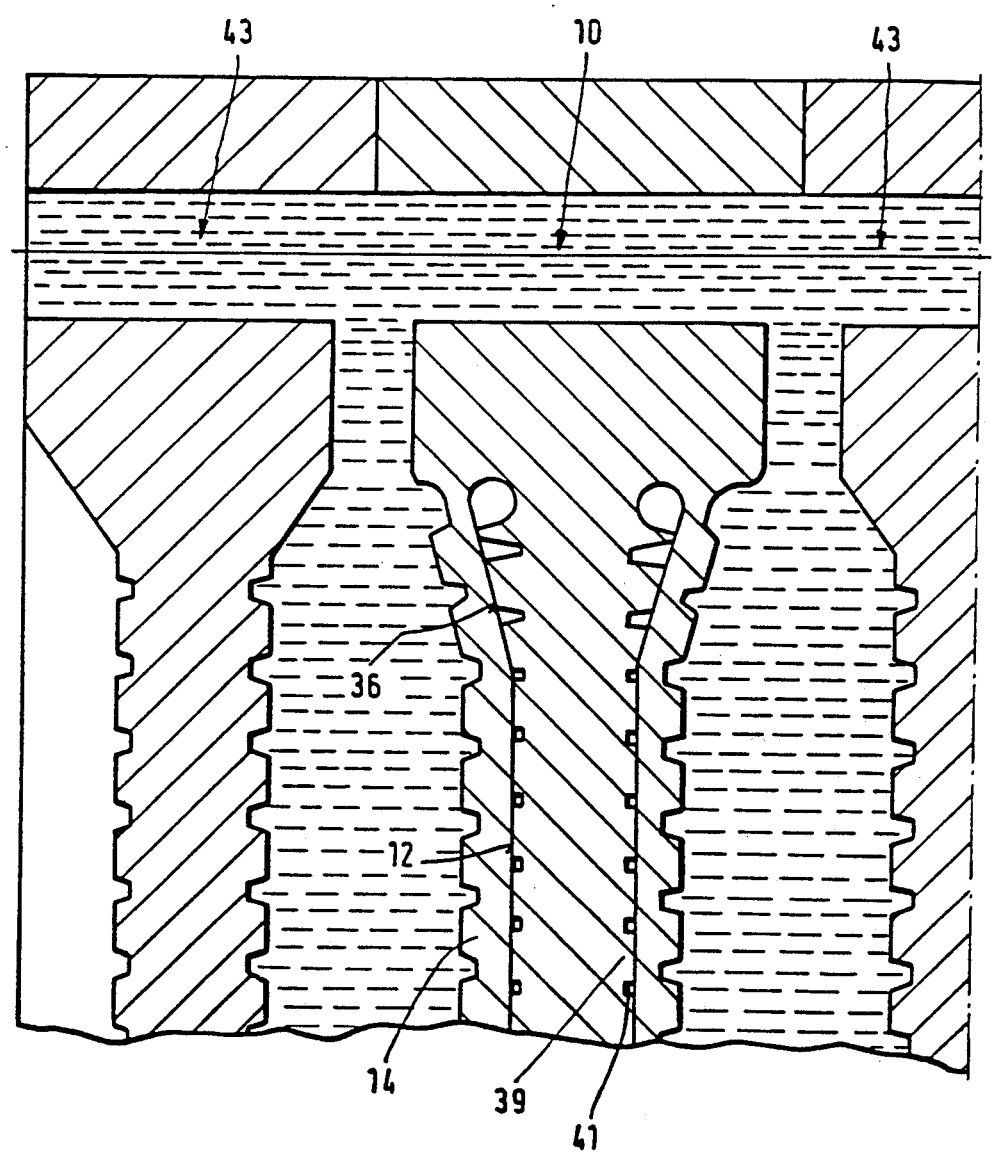
FIG. 19 is a sectional view illustrating the sealing edge area of FIG. 18, but in the filtration phase.
Figure 20:
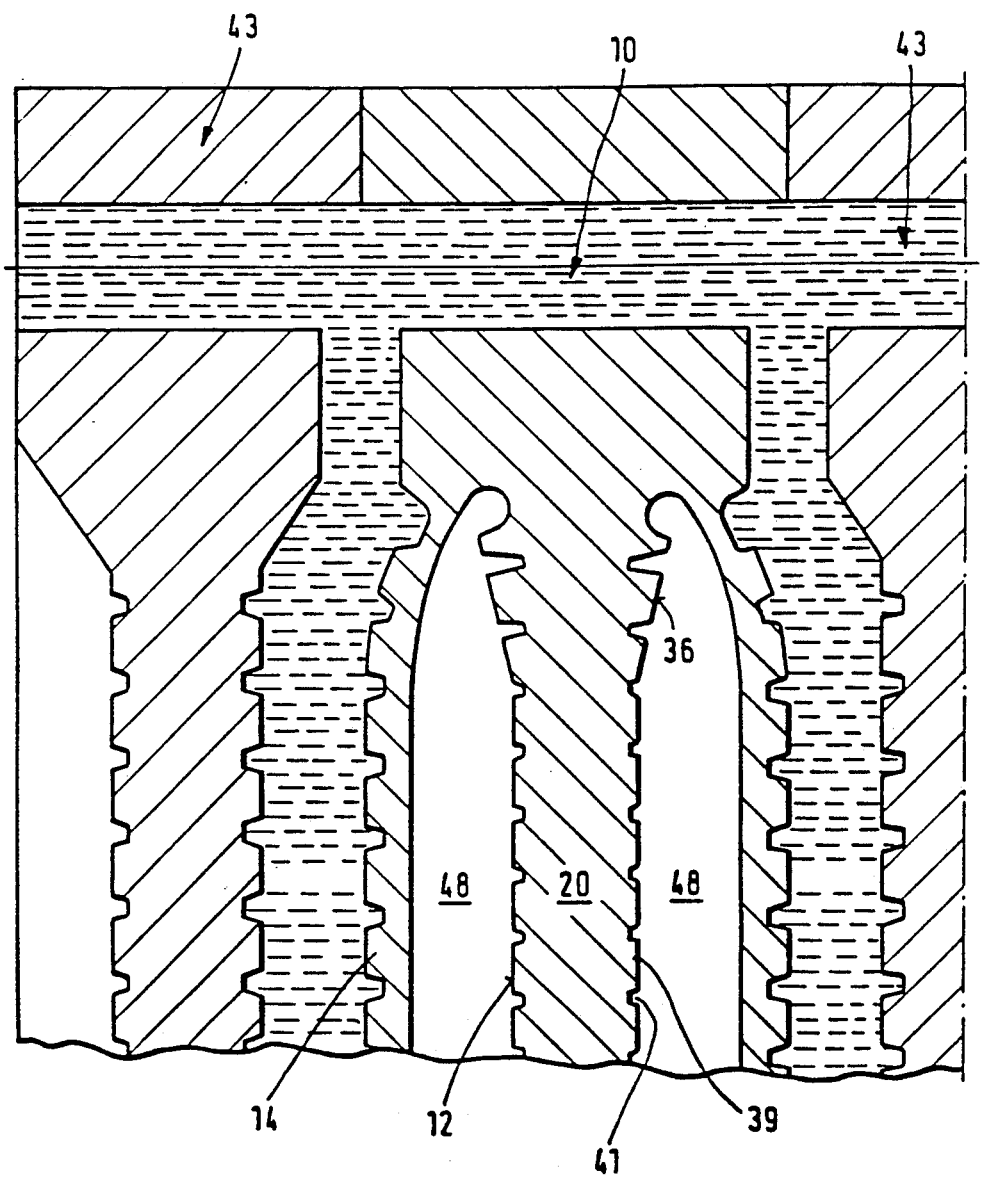
FIG. 20 is a sectional view illustrating the sealing edge area of FIGS. 18 and 19 in the pressing phase.

FIGS. 18 to 20 show a cutout from a filter press, in which the membrane filter plate 10 is in each case arranged between two chamber filter plates 43, which are not provided with membranes. This arrangement fully utilizes the bulging action of membrane 14, clearly shown in FIG. 20, under the influence of the pressurized flow medium supplied to membrane chamber 48 and which simultaneously serves as a coolant in the filtration phase shown in FIG. 19. In operation, the procedure is such that in the filtration phase of FIG. 19, the flow medium is introduced into membrane chamber 48 under a much lower pressure and/or flows through the coolant channel system 41 with a much lower pressure than in the pressing phase of FIG. 20.

The aforementioned cooling ducts 41 can naturally also be used in the aforementioned manner as heating medium ducts (FIGS. 15 to 17). It is then possible to continuously supply membrane chamber 48 with a heating medium, which continuously flows through membrane 48 and/or duct system 41, so that the temperature of both the carrier plate 20 and more particularly the elastic membrane 14 is raised to a higher level than that at which the medium to be filtered can be kept.

The features disclosed in the description, drawings and claims can be essential alone, or in random combinations for realizing the various embodiments of the invention.

We claim:

1. In a membrane filter plate for a filter press comprising a carrier plate, which includes a central recessed surface in an outer surface, both the outer surface and the central recessed surface being parallel to a central plane of the carrier plate, a membrane being secured to the plate and being spaced from the central recessed surface, and in which the carrier plate includes a passageway extending from the exterior of the carrier plate into the space between the membrane and the central recessed surface for supporting a flow of fluid to load the membrane away from the central recessed surface, and in which such loading normally causes the diaphragm to move with a wave motion, the improvements comprising means for causing the diaphragm to move away from the central recessed surface in the manner of a piston, including means defining fluid channels in fluid communication with the passageway and extending across the surface of the carrier plate for supporting a flow of fluid across the surface of the carrier plate.

2. In a membrane filter plate according to claim 1, wherein the channels are formed by a plurality of projections extending from said carrier plate.

3. In a membrane filter plate according to claim 2, wherein each of said projections comprises a circular cross section.

* * * * *